United States Patent [19]
Rhyne

[11] Patent Number: 5,977,950
[45] Date of Patent: Nov. 2, 1999

[54] MANUALLY CONTROLLABLE CURSOR IN A VIRTUAL IMAGE

[75] Inventor: George W. Rhyne, Scottsdale, Ariz.

[73] Assignee: Motorola, Inc., Schaumburg, Ill.

[21] Appl. No.: 08/158,337

[22] Filed: Nov. 29, 1993

[51] Int. Cl.$^6$ .................................................. G09G 5/08
[52] U.S. Cl. ............................. 345/145; 345/7; 345/157
[58] Field of Search ........................... 345/32, 169, 173, 345/156, 145, 157, 31, 7, 8

[56] References Cited

U.S. PATENT DOCUMENTS

| | | | |
|---|---|---|---|
| 4,060,307 | 11/1977 | Demaine | 345/32 |
| 4,451,701 | 5/1984 | Bendig | 345/173 |
| 4,541,698 | 9/1985 | Lerner | 354/82 |
| 4,607,255 | 8/1986 | Fuchs | 345/31 |
| 4,791,478 | 12/1988 | Tredwell | 345/157 |
| 4,803,652 | 2/1989 | Maeser | 345/169 |
| 4,934,773 | 6/1990 | Becker | 345/31 |
| 5,051,738 | 9/1991 | Tanielian | 345/82 |
| 5,123,064 | 6/1992 | Hacker | 345/156 |
| 5,130,838 | 7/1992 | Tanaka . | |
| 5,155,615 | 10/1992 | Tagawa | 345/9 |

*Primary Examiner*—Bipin H. Shalwala
*Assistant Examiner*—Kent Chang
*Attorney, Agent, or Firm*—Eugene A. Parsons; Rennie W. Dover

[57] ABSTRACT

Portable communication equipment having a virtual image display including display electronics and optics for providing a virtual image in the display, cursor electronics connected to the display electronics for producing a manually controllable cursor virtual image in the display, and manual controls mounted on the portable communication equipment and externally accessible by an operator. The manual controls are connected to the cursor electronics for controlling the position and function of the cursor virtual image to provide functions such as pull-down menus and image selection.

20 Claims, 5 Drawing Sheets

MANUALLY CONTROLLABLE CURSOR IN A VIRTUAL IMAGE

FIELD OF THE INVENTION

The present invention pertains to the generation of virtual images in portable electronics equipment and more specifically to interaction with generated virtual images in portable communications equipment.

BACKGROUND OF THE INVENTION

Portable communications receivers, such as radios, cellular and cordless telephones, pagers and the like, are becoming increasingly popular. In many instances it is desirable to provide apparatus on the receiver to supply the operator with visual messages that include graphics and printed information. The problem is that prior art apparatus providing these functions require relatively high electrical power and require a great amount of area to be sufficiently large to produce useful and visually perceivable information.

In the prior art, for example, it is common to provide visual apparatus utilizing liquid crystals, directly viewed light emitting diodes, etc. These produce very large and cumbersome displays that greatly increase the size of the receiver and require relatively large amounts of power.

In one instance, the prior art includes a scanning mirror to produce a visually perceivable image but again this requires relatively large amounts of power and is very complicated and sensitive to shock. Also, the scanning mirror causes vibration in the unit which substantially reduces visual comfort and acceptability.

Apparatus incorporating a miniature virtual image display, which solves most of the problems mentioned above, is disclosed, for example, in U.S. Pat. No. 5,224,198, entitled "WAVEGUIDE VIRTUAL IMAGE DISPLAY", issued Jun. 29, 1993. Typically, the products in which the miniature virtual image display is incorporated are small hand-held devices. Many of the proposed applications would benefit from some interaction with the display.

Accordingly, it is a purpose of the present invention to provide a new and improved manually controllable cursor in a virtual image.

It is a further purpose of the present invention to provide a new and improved manually controllable cursor in a virtual image for use in small hand held devices and which is controllable with the hand holding the device.

SUMMARY OF THE INVENTION

The above problems and others are at least partially solved and the above purposes and others are realized in portable communication equipment having a virtual image display including display electronics and optics for providing a virtual image in the display and cursor electronics connected to the display electronics for producing a manually controllable cursor virtual image in the display. Manual controls are mounted on the portable communication equipment and externally accessible by an operator. The manual controls are connected to the cursor electronics for controlling the position and function of the cursor virtual image to provide image interaction functions such as pull-down menus and image selection.

BRIEF DESCRIPTION OF THE DRAWINGS

Referring to the drawings.

DESCRIPTION OF THE PREFERRED EMBODIMENTS

Figure 1:
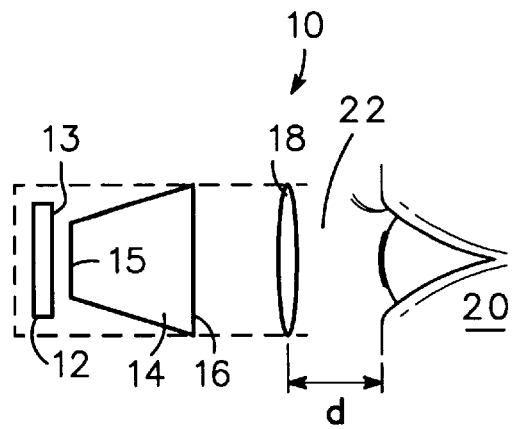
FIG. 1 is a simplified schematic view of a compact virtual image display embodying the present invention.

Referring specifically to FIG. 1, an example of a compact virtual image display 10 is illustrated in a simplified schematic view. Display 10 includes apparatus 12 for providing a real image on a surface 13. A coherent bundle 14 of optical fibers has a first surface 15 positioned adjacent the surface 13 of apparatus 12 and a second surface 16 defined at the opposite end of bundle 14. An optical system, represented by lens 18, is positioned in spaced relation to surface 16 of bundle 14 and, in cooperation with bundle 14, produces a virtual image viewable by an eye 20 spaced from an aperture 22 defined by lens 18.

Figure 2:
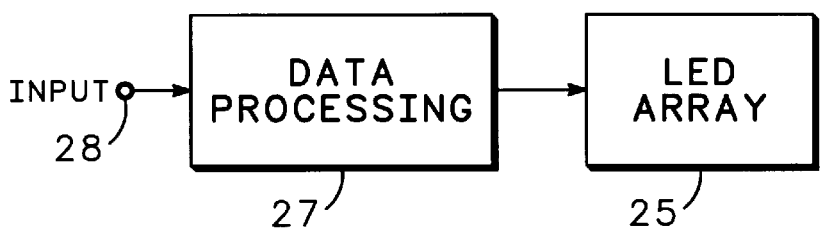
FIG. 2 is a simplified block diagram of electronics associated with the compact virtual image display of FIG. 1.

Apparatus 12 is illustrated in more detail in FIG. 2 and includes, for example, semiconductor electronics such as a light emitting diode (LED) array 25 driven by data processing circuits 27. Data processing circuits 27 include, for example, logic and switching circuit arrays for controlling each LED in LED array 25. Data processing circuits 27 include, in addition to or instead of the logic and switching arrays, a microprocessor or similar circuitry for processing input signals to produce a desired real image on a device such as LED array 25. It will be understood that data processing circuits 27 and LED array 25, while illustrated separately for purposes of this description, could be formed on the same semiconductor chip in some applications.

Figure 3:
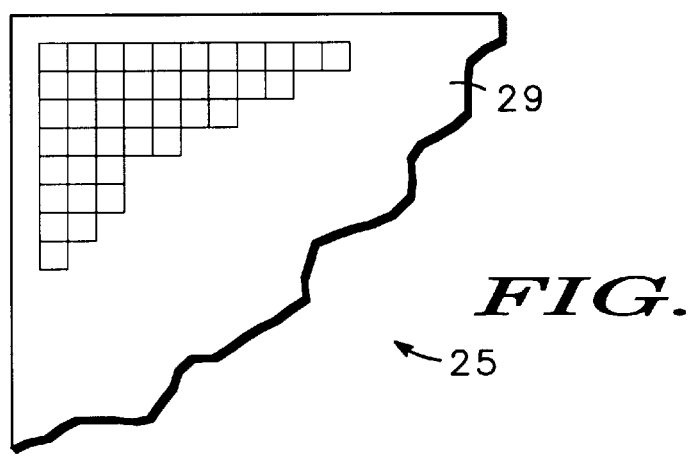
FIG. 3 is an enlarged view in top plan of an LED array, portions thereof broken away, forming a portion of the electronics of FIG. 2.

In this specific embodiment LED array 25 is utilized because of the extremely small size that can be achieved and because of the simplicity of construction and operation. It will of course be understood that other image generating devices may be utilized, including but not limited to lasers, LCDs, CRTs, etc. Referring specifically to FIG. 3, a plan view of LED array 25 is illustrated in which the LEDs are formed in a regular pattern of rows and columns on a single semiconductor chip 29. Portions of chip 29 are broken away to simplify the drawing but it should be understood that many of the other circuits to be described herein could be included on the same chip. By addressing specific LEDs by row and column in a well known manner, the specific LEDs are energized to produce a real image. Digital or analog data is received at input terminal 28 and converted by data processing circuits 27 into signals capable of energizing selected LEDs to generate the predetermined real image.

It will be understood by those skilled in the art that LED array 25 and semiconductor chip 29 are greatly enlarged in the figures. The actual size of semiconductor chip 29 is on the order of a tens of milli-meters along each side, with the light emitting area (real image) being generally in the range of 2 to 50 milli-meters and preferably less than 10 milli-meillimeters, with each LED being less than 20 microns on each side and preferably on the order of as little as one micron on a side. It should be understood that the actual light emitting device array is much smaller because bonding pads, etc., add several milli-meters on each side. Generally, the larger size chips simply mean that more light emitting devices are used in the array to provide more definition, color, etc. As the semiconductor technology reduces the size of the chip, greater magnification and smaller lens systems are required. Reducing the size of the lenses while increasing the magnification results in greatly limiting the field of view, substantially reducing eye relief and reducing the working distance of the lens system.

Surface 15 of bundle 14 is positioned adjacent LED array 25 so as to pick up real images generated thereby and transmit the image by way of the optical fibers to surface 16. Bundle 14 is tapered along the length thereof so that the image at surface 16 is larger than the real image at surface 15. The taper in the present embodiment provides an image at surface 16 which is twice as large as the image at surface 15, which is equivalent to a power of two magnification. It will be understood by those skilled in the art that additional magnification (taper) may be included if desired.

The lens system, represented schematically by lens 18, is mounted in spaced relation from surface 16 of bundle 14 so as to receive the image from surface 16, magnify it an additional predetermined amount and create the aperture within which the virtual image is viewed. In the present embodiment, lens 18 magnifies the image another ten times (10×) so that the real image from LED array 25 is magnified a total of twenty times. Generally, a magnification of at least ten is required to magnify the real image sufficiently to be perceived by a human eye. It will of course be understood that the lens system may be adjustable for focus and additional magnification, if desired, or may be fixed in a housing for simplicity. Because the image received by lens 18 from bundle 14 is much larger than LED array 25, the lens system does not provide the entire magnification and, therefore, is constructed larger and with less magnification. Because of this larger size, the lens system has a larger field of view and a greater working distance.

Eye relief is the distance that eye 20 can be positioned from lens system 18 (the viewing aperture) and still properly view the image, which distance is denoted by "d" in FIG. 1. Because of the size of lens 18, eye relief, or the distance d, is sufficient to provide comfortable viewing and in the present embodiment is great enough to allow a viewer to wear normal eyeglasses, if desired.

Figure 4:
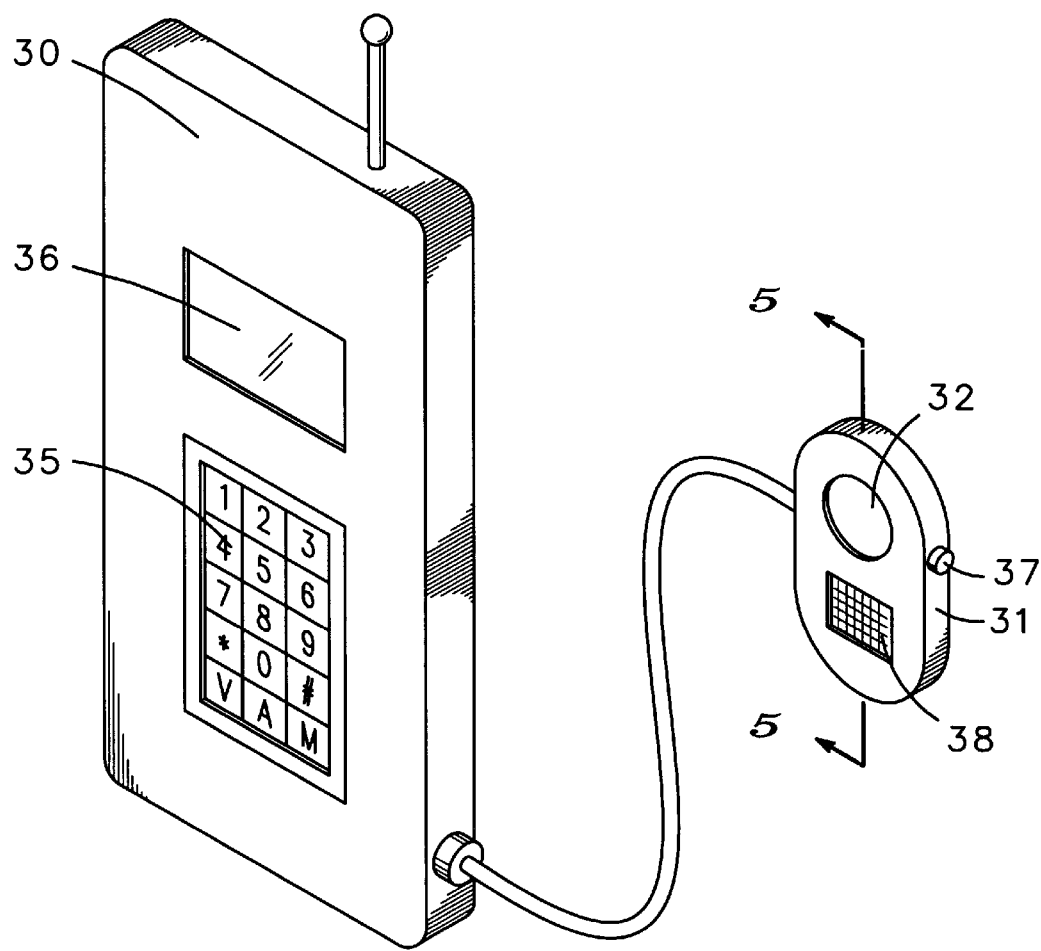
FIG. 4 is a perspective view of portable communication equipment embodying the present invention.

FIG. 4, illustrates a portable communications receiver 30 having a hand held microphone 31 with a miniature virtual display 32 mounted therein It will of course be understood that portable communications receiver 30 can be any of the well known portable receivers, such as a cellular or cordless telephone, a two-way radio, a pager, etc. In the present embodiment, for purposes of explanation only, portable communications receiver 30 is a portable two-way police radio, generally the type carried by police officers on duty or security guards. Portable communications receiver 30 includes a control panel 35 for initiating calls and a standard visual display 36, if desired, for indicating the number called or the number calling. Alternately, 36 includes a speaker in addition to or instead of the visual display. Hand held microphone 31 has a cursor control switch 37 and a voice pick-up 38.

Figure 5:
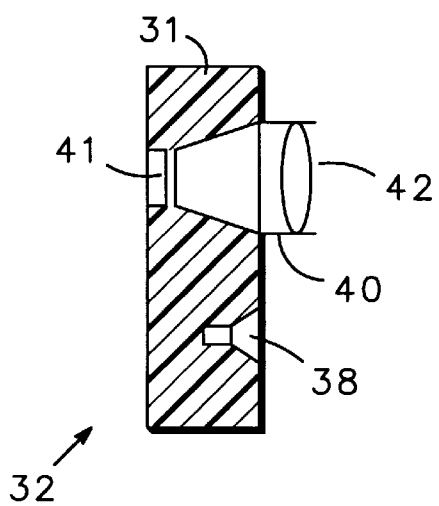
FIG. 5 is a simplified sectional view as seen from the line 5—5 of FIG. 4.

Referring to FIG. 5, a simplified sectional view of hand held microphone 31, as seen from the line 5—5, is illustrated. Miniature virtual display 32 includes image generation apparatus 41 for providing a real image to a fixed optical system 40, which in turn produces a virtual image viewable by the operator through an aperture 42. Fixed optical system 40 is constructed to magnify the entire real image from image generation apparatus 41, without utilizing moving parts, so that the virtual image viewable through aperture 42 is a complete frame, or picture, which appears to be very large and is easily discernable by the operator. By producing a virtual image from the very small real image of the apparatus 41, fixed optical system 40 is relatively small and adds virtually no additional space requirements to hand held microphone 31. Optical system 40 is constructed with no moving parts, other than optional features such as focusing, zoom lenses, etc. Further, apparatus 41 requires very little electrical power to generate the real image and, therefore, adds very little to the power requirements of portable communications receiver 30.

Cursor control switch 37 is provided so that an operator of portable communications receiver 30 can provide and control a cursor in the virtual image which is being viewed. Cursor control switch 37 is coupled to electronics (to be described presently) for controlling the position and function of the cursor virtual image. The cursor electronics include circuits for controlling the virtual image in the display, through control of the cursor virtual image, including the function of selecting specific virtual images from a menu of virtual images. In this specific embodiment the manual controls, or cursor control switch 37, include a touch pad, to be described in detail presently. In general, the touch pad includes means for providing a control signal alterable in accordance with portions of the touch pad being touched. The touch pad can be, for example, any of the touch pad type of switches presently commercially available on the market. Portable communication equipment 30, in this example specifically microphone 31, is designed to be held by an operator with one hand and cursor control switch 37 is positioned on portable communication equipment 30 so as to be operated with a finger of the hand holding microphone 31. This allows the operator to view the virtual image in viewing aperture 42 and operate the cursor virtual image through cursor control switch 37 with a single hand.

Figure 6:
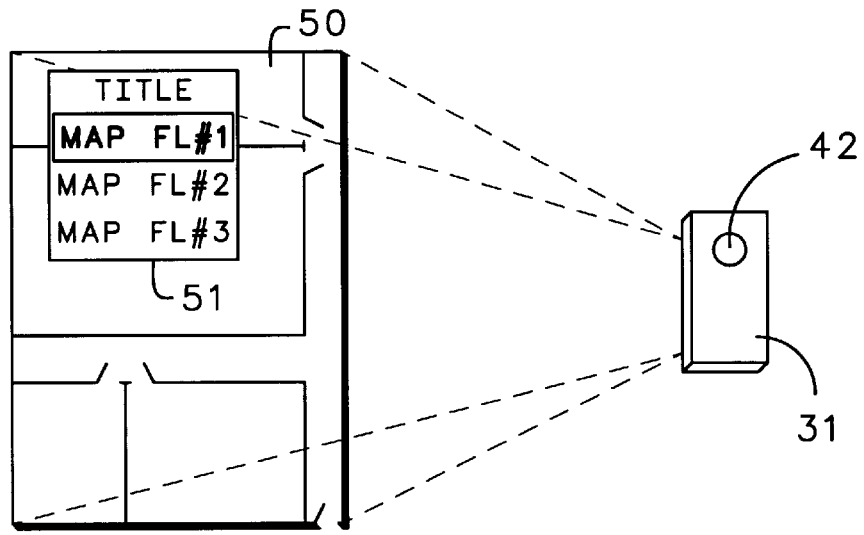
FIG. 6 is a view in perspective illustrating a typical view as seen by the operator of the portable communications receiver of FIG. 4.

FIG. 6 is a perspective view of hand held microphone 31 illustrating a typical view 50 (virtual image) seen by an operator looking into viewing aperture 42 of miniature virtual image display 32. View 50 could be, for example, a floor plan of a building about to be entered by the operator (a policeman). The floor plan is on file at the police station and, when assistance is requested by the policeman, the station simply transmits the previously recorded plan. Similarly, miniature virtual image display 32 might be utilized to transmit pictures of missing persons or wanted criminals, maps, extremely long messages, or virtually any combination of graphics and alpha-numeric characters. Many other variations, such as silent receiver operation in situations where pager beeps and/or audio signals might be disruptive or a breach of secrecy, wherein the message appears on display 32 instead of audibly, are possible.

View 50, as seen in viewing aperture 42, also features a pull-down menu 51, which is actuated to the pull-down position by operation of cursor control switch 37. In this particular example, pull-down menu 51 includes a plurality of different virtual images that can be selected by cursor control switch 37. As illustrated, the operator has selected view 50, or a floor plan of the particular building the operator is in. Many other forms of graphical and/or alpha-numeric information might be available to the operator and easily selected by the operator through control of the cursor by manipulation of cursor control switch 37.

Figure 7:
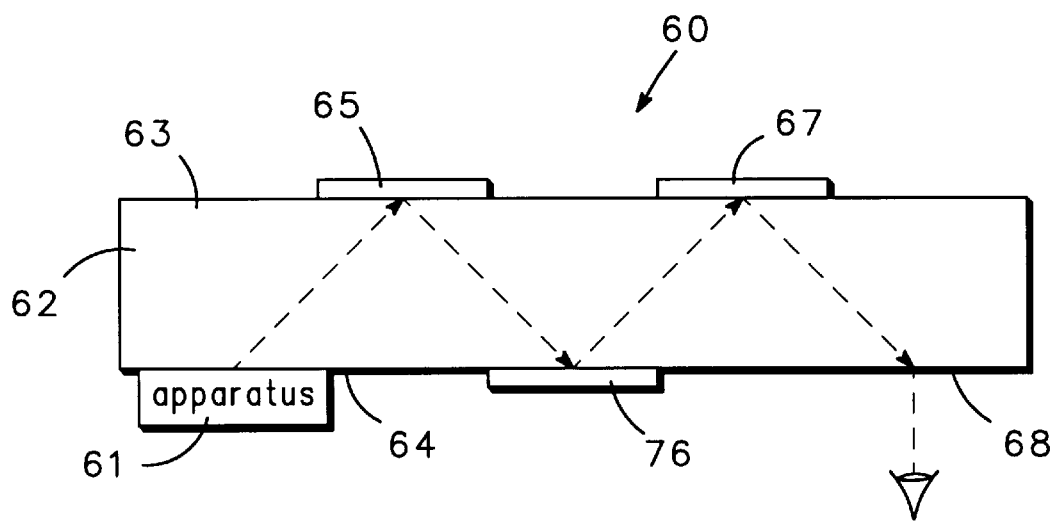
FIG. 7 is a side view of an embodiment of a waveguide virtual image display.

Referring specifically to FIG. 7, another embodiment of a virtual image display 60 is illustrated wherein apparatus 61 (generally similar to apparatus 12 of FIG. 1) is affixed to the inlet of a waveguide 62 for providing a real image thereto. Light rays from the real image at apparatus 61 are directed angularly toward a predetermined area on a first side 63 where they are reflected back toward a second side 64 generally along an optical path defined by sides 63 and 64. Three diffractive lenses 65, 66 and 67 are affixed to sides 63 and 64 at the next three predetermined areas, respectively, to which the reflected light rays are directed. Diffractive lenses 65, 66, and 67 provide the required amount of magnification so that a virtual image of a desired size is viewable through a last diffractive element 68 which defines the outlet of optical waveguide 62. Virtual image display 60, or a similar virtual image display disclosed in U.S. Pat. No. 5,224,198, entitled "WAVEGUIDE VIRTUAL IMAGE DISPLAY", issued Jun. 29, 1993, could be utilized, for example, to replace miniature virtual image display 32 of FIG. 5.

Figure 8:
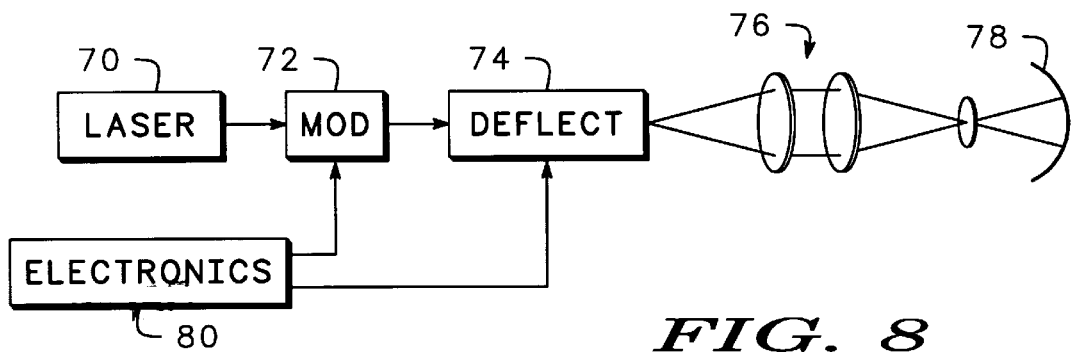
FIG. 8 is a simplified block diagram of a direct retinal scan type of virtual image display.

FIG. 8 is a block diagram of a direct retinal scan display, which might also be utilized as the miniature image display to replace, for example, miniature virtual image display 32 of FIG. 5. A laser 70, which may be any of the well known lasers including solid state lasers, such as vertical cavity surface emitting lasers, diode lasers, diode-pumped lasers, etc., supplies a coherent light beam to a modulator 72. Modulator 72 impresses video information onto the light beam generally by modulating the intensity of the light beam as, for example, by providing changes in the power level of laser 70. Depending upon the application, the modulation could be as simple as turning laser 70 off and on, which essentially translates into a digital system. Acousto-optic modulators are one of the preferred modulators for most applications, but other techniques, such as electro-optics and mechanical are completely feasible.

The modulated light beam from modulator 72 is directed to a deflection system 74. A lens system 76 is used to focus the light beam from deflection system 74 into an eye 78. The focal length of lens system 76 is chosen so that the scanning system focal point is within the pupil of eye 78 and the coherent beam focal point is at the retina of eye 78.

Timing and control of modulator 72 and deflection system 74 is provided by electronics 80. Electronics 80 includes a basic oscillator, or timer, which provides the timing signals to cause the sweeping and modulating to occur at the proper times. Also, electronics 80 provides video signals to modulator 72 to modulate the light beam to the correct intensity at the required times. Further, electronics 80 provides horizontal and vertical (orthogonal) deflection signals to cause deflection system 74 to periodically scan the light beam in a raster. Depending upon the application and the desired image resolution, the horizontal deflection frequency may be on the order of 15 to 30 kHz., the vertical deflection is no lower than 60 Hz., and the modulating frequency may be on the order of 12 MHz.

The purpose of deflection system 74 is to scan the modulated light beam on the retina of eye 78, or "write" an image on the retina. There are many possible configurations for deflection system 74 and lens system 76, depending upon the application of the display and how it is desired to form the image in eye 78. Additional information on this type of display is available in a copending U.S. patent application entitled "DIRECT RETINAL SCAN DISPLAY", Ser. No. 07/857,193, filed Mar. 24, 1992 and assigned to the same assignee. While the direct retinal scan display does not technically generate a virtual image, the direct retinal scan display is included in the definition of a virtual display for purposes of this disclosure because of the similarity thereto.

Figure 9:
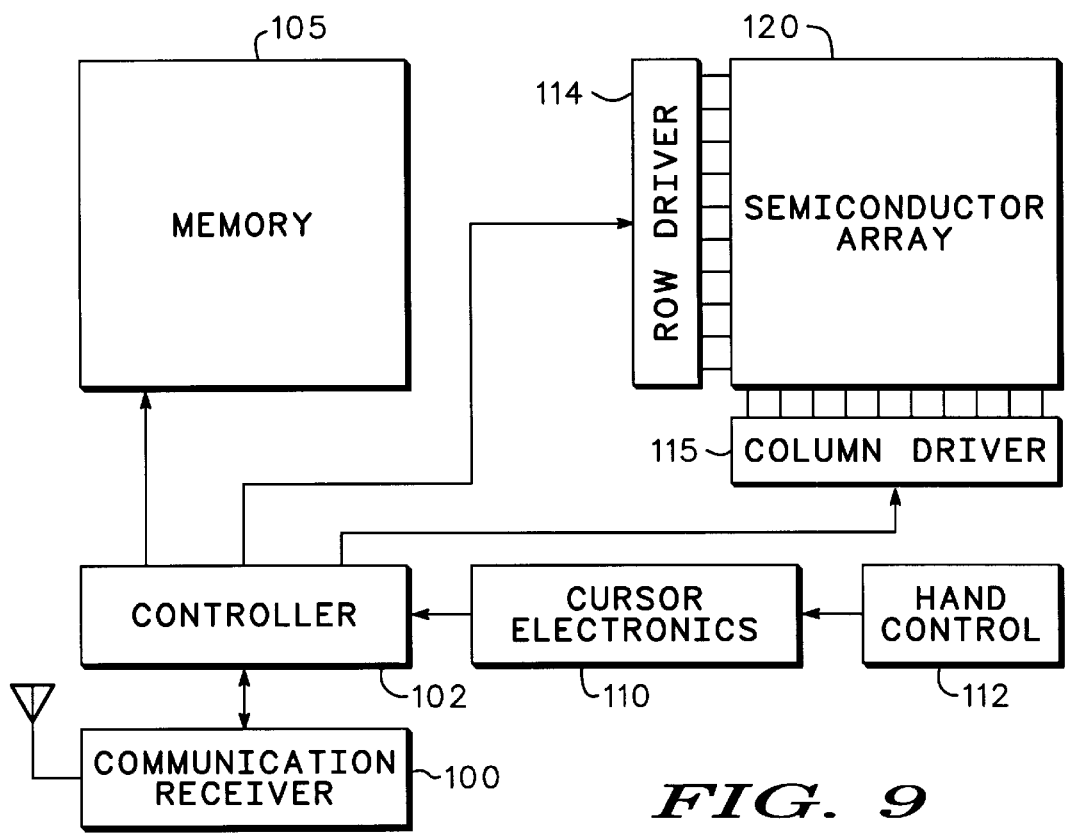
FIG. 9 is a block diagram of electronics for communication equipment embodying the present invention.

Referring specifically to FIG. 9, a block diagram of electronics for communication equipment embodying the present invention is illustrated. A communication receiver 100 can be any of the well known portable receivers, such as a cellular or cordless telephone, a two-way radio, a pager, etc. Receiver 100 has a data output connected to a controller 102 which may be a microprocessor, a DSP, specially designed logic circuits, etc. A memory 105 is connected to controller 102 and stores information and messages, graphic and/or alpha-numeric, received by receiver 100 in accordance with the programming of controller 102. Cursor electronics 110, controlled by a hand control 112 such as cursor control switch 37 of FIG. 4, are also connected to an input or inputs of controller 102.

Controller 102 receives video data from memory 105 and cursor electronics 110 and supplies the video data to row and column drivers 114 and 115, respectively, which in turn activate specific light generating devices in a semiconductor array 120 to produce the desired picture or frame of information. In a specific example timing signals are supplied to row drivers 114 to supply an activating potential to each complete row, one at a time, and in a periodic sequence from the first row at the top to the last row at the bottom. Simultaneously a complete row of video data is placed in column drivers 115, which generally include a latching function, and the data is supplied to the row of devices receiving the activating potential from the row drivers 114. When the second row is activated by row drivers 114, a new row of data is switched into array 120 from column drivers 115. In this fashion a complete real image is generated with the definition and quality depending upon the number of devices included in array 120. Generally, it is desirable to include in the range of 500 to 1500 pixels by 500 to 1500 pixels with each pixel including at least one light emitting device, and possible several for purposes of color and/or redundancy.

Figure 10:
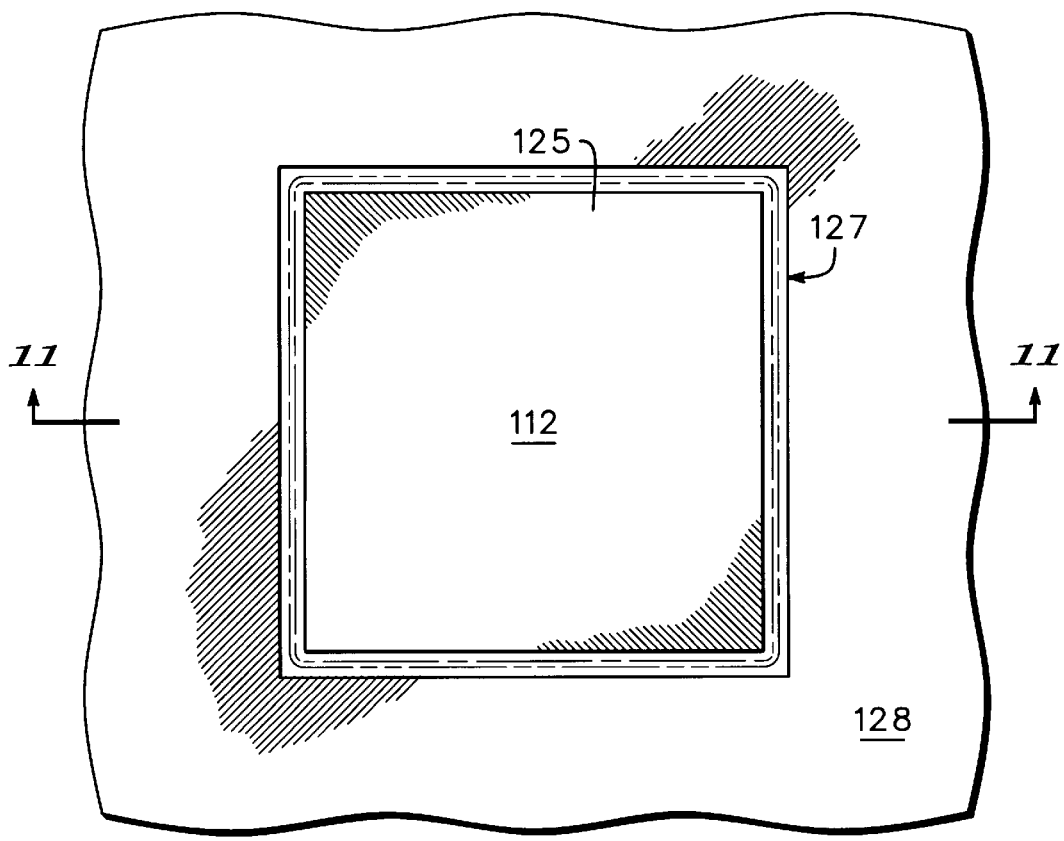
FIG. 10 is a view in top plan of touch pad included as a part of the electronics of FIG. 9.
Figure 11:
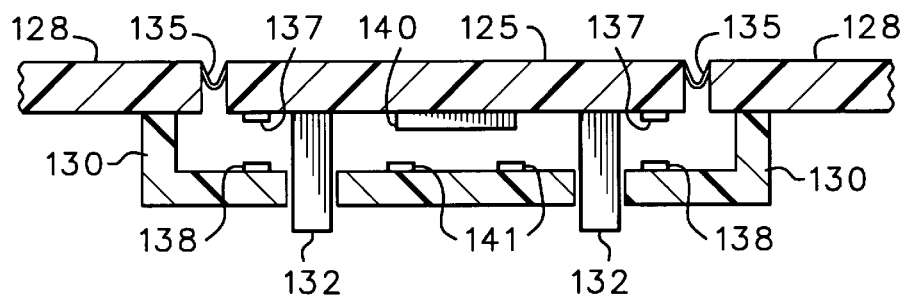
FIG. 11 is a sectional view of the touch pad as seen from the line 11—11 of FIG. 10.
Figure 12:
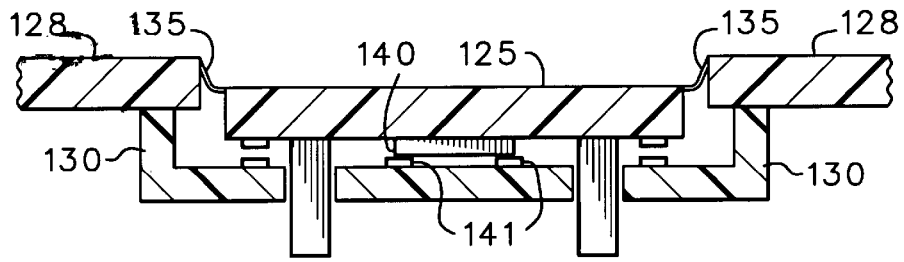
FIG. 12 is a sectional view similar to FIG. 11 with the touch pad in a different configuration.

Referring to FIGS. 10, 11 and 12, a top plan and sectional views of a touch pad type hand switch are illustrated. For continuity of disclosure and to illustrate that the touch pad can be utilized as hand control 112 in FIG. 9, the touch pad of FIG. 10 is designated 112 herein. Touch pad 112 includes a pad 125 mounted in an opening 127 in a housing 128 of portable communication equipment by means of support structure 130. Pad 125 has at least four legs 132 slideably engaged in support structure 130 for limited vertical movement. A flexible hood 135 is affixed in opening 127 between pad 125 and housing 128 to prevent dust, moisture, etc. from entering housing 128 and affecting circuits and other components.

A plurality of electrical contacts 137 are mounted around the edges of the underside of pad 125 and a plurality of matching electrical contacts 138 are mounted therebelow on support structure 130. Pad 125 is mounted within support structure 130 so that pressure on one side of pad 125 allows some of the electrical contact 137 and 138 to electrically close without closing contacts on the other side of pad 125. Contacts 137 and 138 are coupled to an address generator (e.g., circuitry including counters, a pair of low frequency oscillators, etc.) that are controllable to provide higher and lower row and column addresses. Thus by depressing pad 125 on a selected side, a desired direction of movement signals can be generated to move the cursor in the desired direction.

Cursor electronics 110 actually provide control signals to controller 102 which are converted into the form of (or are in the form of) timing and data signals so that a cursor appears in the real image generated by array 120. The cursor image may utilize anywhere from one to several adjacent pixels, depending upon the shape and size desired, and as touch pad (hand control) 112 is operated the specific position of the cursor is moved by simply sending the addresses of different rows and columns from cursor electronics 110 to controller 102. The row and column address signals are supplied to controller 102 which applies the signals as row and column video signals to the row and column drivers 114 and 115 to provide an image of the cursor either positioned at a selected spot or moving toward a selected spot. It will be understood by those skilled in the art that the image of the cursor is simply an indicator for the convenience of the operator and the actual selection of the video to be illustrated is accomplished by supplying the address signals to memory 105 through controller 102.

An electrical contact 140 is positioned generally centrally in the underside of pad 125 and one or two matching contacts 141 are positioned on support structure 130 directly therebelow. It should be noted that wiring pairs of contacts on support structure 130 for closure by a contact on pad 125 is simpler to fabricate since no difficult electrical wiring is necessary to pad 125. When pad 125 is depressed straight down contact 140 completes a circuit through contacts 141, but none of the contacts 137 and 138 are engaged because contact 140 is thicker than contacts 137. In this situation a signal is supplied to controller 102 which is generally used, for example, to select a particular portion of memory 105 being addressed at that time.

In operation, display 32 (see FIG. 4) is either turned on with a separate switch or is connected to turn on with communication receiver 30. Pad 125 is then depressed on a selected side or sides and some of the electrical contacts 137 and 138 are electrically closed to move the cursor to a desired location, for example, to a title "VIDEO" for pull-down menu 51 (FIG. 6). Pad 125 is then depressed straight down to provide a "select" signal to controller 102 and pull-down menu 51 appears. Pad 125 is then depressed on a selected side or sides and some of the electrical contacts 137 and 138 are electrically closed to move the cursor to a desired title on pull-down menu 51, and highlight in this example the title "MAP FL #1". Pad 125 is then depressed straight down to provide a "select" signal to controller 102 which supplies a "select" signal to controller 102 to select the stored video information for a map of floor number one. The row and column address signals supplied to controller 102 are also supplied to memory 105 and when the "select" signal is supplied to controller 102 the addressed portion of memory 105 is selected to be applied as video to row and column drivers 114 and 115, in this example view 50 or the video illustrating a map of floor number one.

Accordingly, a new and improved manually controllable cursor in a virtual image is disclosed. The new and improved manually controllable cursor in a virtual image is designed for use in small hand held electronic devices and is situated so as to be controllable with the hand holding the device. Further, while specific hand controls have been disclosed it will be understood by those skilled in the art that other controls, incorporating existing technologies, such as resistive methods, capacitive methods, or acoustic wave methods can be utilized. In many of these technologies the required changes are accomplished by simply horizontally sliding a finger across a touch pad with light pressure. Then by depressing the pad a menu item is selected, additional menus are selected, scrolling of the video is accomplished, etc. Thus, a cursor and apparatus for interaction with a virtual display is disclosed which is small and easy to operate so that it can be incorporated into very small electronic equipment, such as radios, cellular and cordless telephones, pagers and the like.

While I have shown and described specific embodiments of the present invention, further modifications and improvements will occur to those skilled in the art. I desire it to be understood, therefore, that this invention is not limited to the particular forms shown and I intend in the appended claims to cover all modifications that do not depart from the spirit and scope of this invention.

What is claimed is:

1. Portable electronics equipment with manually controllable cursor comprising:

a hand held electronic device;

a virtual display including display electronics having a two-dimensional array of pixels providing a small real image of a complete frame of alphagraphics and magnifying optics for providing a magnified perceivable virtual image of the complete frame of alphagraphics in the virtual display, the virtual display being mounted in the hand held electronic device for viewing of the magnified perceivable virtual image by an operator;

cursor electronics mounted in the hand held electronic device and connected to the display electronics for producing a manually controllable cursor virtual image in the virtual display; and manual controls mounted on the hand held electronic device and externally accessible by the operator, the manual controls being connected to the cursor electronics for controlling the position and function of the cursor virtual image within the magnified perceivable virtual image of the complete frame of alphagraphics.

2. Portable electronics equipment as claimed in claim 1 wherein the display electronics and the cursor electronics include circuits for controlling the virtual image in the virtual display including the function of selecting specific virtual images from a menu of virtual images.

3. Portable electronics equipment as claimed in claim 1 wherein the manual controls include a touch pad.

4. Portable electronics equipment as claimed in claim 3 wherein the touch pad includes means for providing a control signal continuously alterable in accordance with portions of the touch pad being touched.

5. Portable electronics equipment as claimed in claim 3 wherein the touch pad includes means for providing an image selection control signal.

6. Portable electronics equipment as claimed in claim 3 wherein the hand held electronic device is designed to be held by the operator with one hand and the touch pad is positioned on the hand held electronic device so as to be operated with a finger of the one hand.

7. A portable communication receiver with virtual display and manually controllable cursor comprising:
   a hand held communication receiver; and
   a miniature virtual image display electrically connected to and mounted in the hand held communications receiver and having a viewing aperture, the virtual image display including
      image generation apparatus having a two-dimensional array of pixels with each pixel including at least one light emitting device and driving electronics connected to the array for providing a real image of a complete frame of alphagraphics,
      cursor electronics connected to the image generation apparatus for producing a manually controllable cursor image in the real image of the complete frame of alphagraphics,
      manual controls mounted on the hand held communication receiver and externally accessible by an operator, the manual controls being electrically connected to the cursor electronics for controlling the position and function of the cursor image within the complete frame of alphagraphics, and
      an optical system mounted adjacent the image generation apparatus to receive the real image of the complete frame of alphagraphics and the cursor image therefrom, magnify the real image of the complete frame of alphagraphics and the cursor image and produce a virtual image including a manually controllable cursor and the complete frame of alphagraphics at the viewing aperture, the optical system producing a magnification sufficient to easily perceive the virtual image of the complete frame of alphagraphics and the manually controllable cursor through the viewing aperture.

8. A portable communication receiver with virtual display and manually controllable cursor as claimed in claim 7 wherein the image generation apparatus includes a plurality of pixels positioned in rows and columns and sufficient in number, each row including in the range of 500 to 1500 pixels and each column including in the range of 500 to 1500 pixels, to form an image of an entire page.

9. A portable communication receiver with virtual display and manually controllable cursor as claimed in claim 8 wherein the plurality of pixels each includes at least one semiconductor light generating device and all of the light generating devices are formed on a single semiconductor substrate.

10. A portable communication receiver with virtual display and manually controllable cursor as claimed in claim 7 wherein the two-dimensional array of pixels with each pixel including at least one light emitting device of the image generation apparatus providing the real image includes a light emitting diode array.

11. A portable communication receiver with virtual display and manually controllable cursor as claimed in claim 7 including in addition image forming electronics connected to the image generation apparatus providing the real image and to the hand held communication receiver, the image generation apparatus producing the real image in accordance with signals received from the hand held communication receiver.

12. A portable communication receiver with virtual display and manually controllable cursor as claimed in claim 7 wherein the two-dimensional array of pixels with each pixel including at least one light emitting device of the apparatus providing the real image includes semiconductor lasers.

13. A portable communication receiver with virtual display and manually controllable cursor as claimed in claim 7 wherein the hand held communications receiver is a pager.

14. A portable communication receiver with virtual display and manually controllable cursor as claimed in claim 7 wherein the image generation apparatus and the cursor electronics include circuits for controlling the virtual image in the display including the function of selecting specific virtual images from a menu of virtual images.

15. A portable communication receiver with virtual display and manually controllable cursor as claimed in claim 7 wherein the manual controls include a touch pad.

16. A portable communication receiver with virtual display and manually controllable cursor as claimed in claim 15 wherein the touch pad includes means for providing a control signal continuously alterable in accordance with portions of the touch pad being touched.

17. A portable communication receiver with virtual display and manually controllable cursor as claimed in claim 16 wherein the touch pad further includes means for providing an image selection control signal.

18. A portable communication receiver with virtual display and manually controllable cursor as claimed in claim 15 wherein the hand held communication receiver is designed to be held by the operator with one hand and the touch pad is positioned on the portable communication equipment so as to be operated with a finger of the one hand.

19. Portable electronics equipment as claimed in claim 1 wherein the virtual display includes a plurality of pixels formed on a single substrate in an array arranged in rows and columns with each row including in the range of 500 to 1500 pixels and each column including in the range of 500 to 1500 pixels, each of the plurality of pixels including at least one light emitting diode and the array providing a very small real image, the optics including components to magnify the real image at least ten times into a virtual image such that the complete frame of alphagraphics can be perceived by a human eye.

20. A portable communication receiver with virtual display and manually controllable cursor as claimed in claim 7 wherein the image generation apparatus includes a plurality of pixels formed on a single substrate in an array arranged in rows and columns with each row including in the range of 500 to 1500 pixels and each column including in the range of 500 to 1500 pixels, each of the plurality of pixels including at least one light emitting diode and the array providing a very small real image, the optical system including components to magnify the real image and the cursor image at least ten times into a virtual image such that the complete frame of alphagraphics and the manually controllable cursor can be perceived by a human eye.

\* \* \* \* \*